United States Patent [19]

Chi

[11] Patent Number: 5,286,118
[45] Date of Patent: Feb. 15, 1994

[54] JOURNAL OF A BICYCLE HAVING A SHOCK ABSORPTION CONFIGURATION

[76] Inventor: Yi Chen Chi, No. 139-5, An Mei Rd., Mei Shan Village, Hou Li Hsiang, Taichung Hsien, Taiwan

[21] Appl. No.: 893,459

[22] Filed: Jun. 4, 1992

[51] Int. Cl.⁵ .............................................. F16C 27/08
[52] U.S. Cl. .................................... 384/545; 280/276; 384/536
[58] Field of Search ................ 384/536, 540, 543–545; 280/276, 279

[56] References Cited

U.S. PATENT DOCUMENTS

| | | | |
|---|---|---|---|
| 2,233,313 | 2/1941 | Hazelroth | 280/276 |
| 2,687,898 | 8/1954 | Schwinn | 280/276 |
| 3,241,858 | 3/1966 | Duffy | 280/276 |
| 3,936,076 | 2/1976 | Probst | 280/276 |
| 4,531,756 | 7/1985 | Mori | 384/517 X |
| 4,934,839 | 6/1990 | Chi | 384/477 |
| 4,960,342 | 10/1990 | Chi | 403/24 |
| 5,163,758 | 11/1992 | Chi | 384/545 X |

Primary Examiner—Thomas R. Hannon
Attorney, Agent, or Firm—Head & Johnson

[57] ABSTRACT

A journal including a cap engaged on a head tube of the bicycle, a bowl rotatably engaged on the cap, a nut engaged on the bowl, a sleeve extended downward from the nut and an annular notch formed in the lower portion of the nut, two elastomeric rings engaged in the annular notch of the nut, one of the rings engaged between the nut and the bowl, and the other ring engaged between the sleeve and the bowl in order to absorb shocks and vibrations transmitted to the journal.

12 Claims, 3 Drawing Sheets

JOURNAL OF A BICYCLE HAVING A SHOCK ABSORPTION CONFIGURATION

BACKGROUND OF THE INVENTION

1. Field of the Invention

The present invention relates to a journal of a frame fork of a bicycle, and more particularly to a journal of a frame fork of a bicycle having a shock absorption configuration.

2. Description of the Prior Art

The closest prior art of which applicant is aware is his prior U.S. Pat. Nos. 4,934,839 and 4,960,342, in which no shock absorption configurations are included therein.

The present invention has arisen to mitigate and/or obviate the afore-described disadvantages of the conventional journals of bicycles.

SUMMARY OF THE INVENTION

The primary objective of the present invention is to provide a journal of a frame fork of a bicycle having a shock absorption configuration.

In accordance with one aspect of the invention, there is provided a journal of a bicycle comprising a cap engaged on a head tube of the bicycle, a bowl rotatably engaged on the cap, a bearing engaged between the cap and the bowl, a compression nut engaged on the bowl, a sleeve portion extended downward from the compression nut and arranged such that an annular notch is formed between a lower portion of the compression nut and an outer peripheral portion of the sleeve portion, a first ring and a second ring engaged in the annular notch of the compression nut, the first ring engaged between the lower portion of the compression nut and the bowl, and the second ring engaged between the sleeve portion of the compression nut and the bowl in order to absorb shocks and vibrations that transmitted to the journal.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
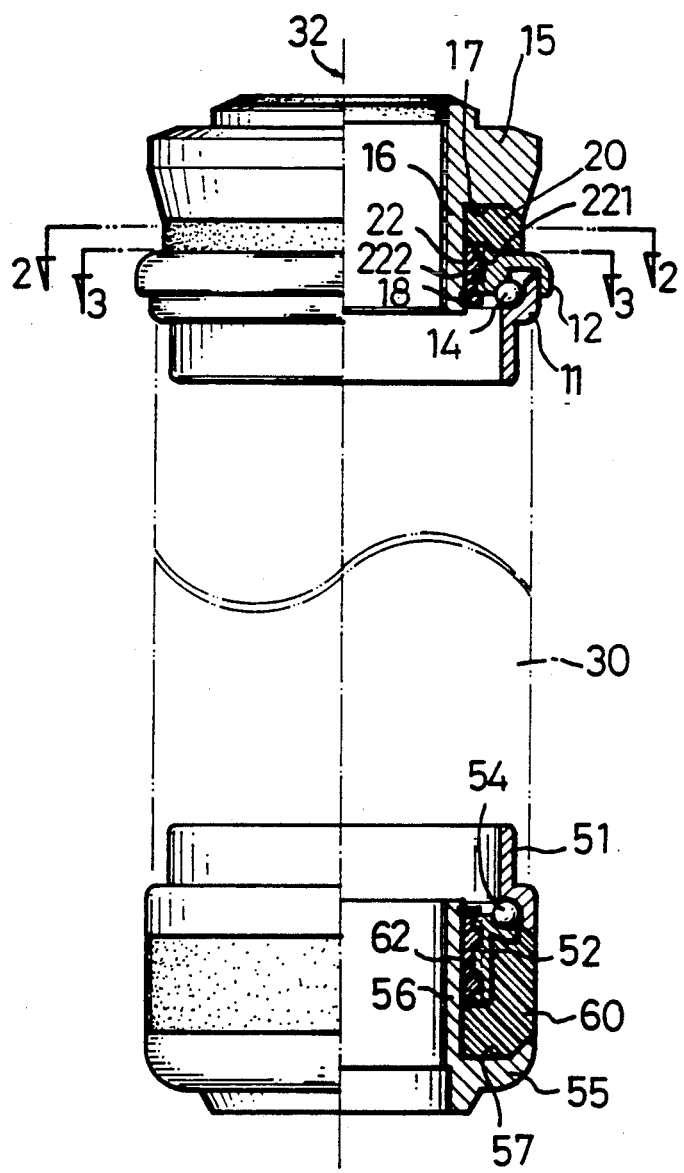
FIG. 1 is a partial cross sectional view of a journal in accordance with the present invention.
Figure 2:
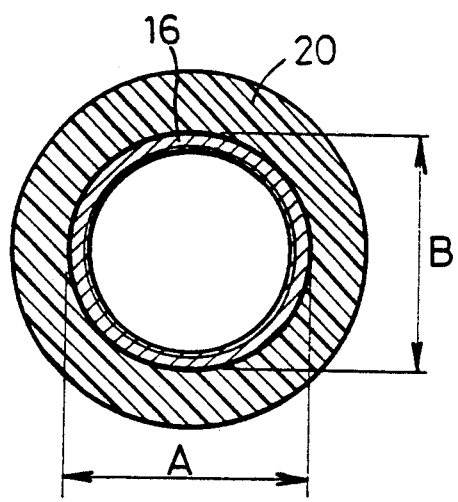
FIGS. 2 and 3 are cross sectional views taken along lines 2—2 and 3—3 of FIG. 1 respectively.
Figure 3:
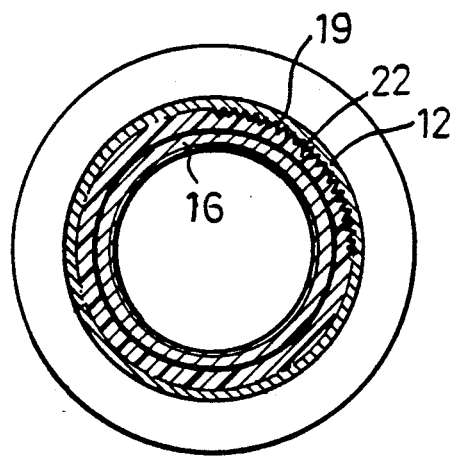

Referring to the drawings, and initially to FIGS. 1 to 3, a journal of a frame fork of a bicycle comprises a cap 11 engaged on the upper portion of a head tube 30 of a bicycle, a bowl 12 rotatably engaged on the cap 11 with a bearing 14 disposed therebetween, and a compression nut 15 engaged on the bowl 12 and threadedly engaged on the upper portion of the frame fork (not shown).

The compression nut 15 includes a sleeve portion 16 extended downward therefrom and arranged such that an annular notch 17 is formed between the lower portion of the compression nut 15 and the outer peripheral portion of the sleeve portion 16, and a clamping ring 18 engaged on the lower and outer peripheral portion of the sleeve portion 16 for engagement with the inner and lower portion of the bowl 12. A first ring 20 and a second ring 22 are engaged in the annular notch 17 of the compression nut 15, in which the first ring 20 is engaged in the upper portion of the annular notch 17 and engaged above the bowl 12, and the second ring 22 is engaged between the sleeve portion 16 of the compression nut 15 and the bowl 12. The rings 20, 22 are preferably made of elastomeric materials for absorbing shocks and vibrations transmitted thereto.

The second ring 22 includes a rib 221 formed on the outer peripheral portion thereof for engagement in an annular slot 222 formed in the inner peripheral portion of the bowl 12, and as best shown in FIG. 3, a plurality of teeth 19 which are extended in parallel to the longitudinal axis 32 of the head tube 30 are formed on the outer peripheral portion of the second ring 22 other than the rib 221, in order to engage with corresponding teeth formed in the inner peripheral portion of the bowl 12, such that the second ring 22 moves in concert with the bowl 12.

As best shown in FIG. 2, the sleeve portion 16 of the compression nut 15 includes a circular inner peripheral portion for threadedly engaging onto the frame fork of a bicycle, however, the outer peripheral portion of the sleeve portion 16 is made elliptical including, for example, a major axis and a minor axis, the length of the major axis A is slightly larger than that of the minor axis B, the difference between the lengths A and B is preferably maintained at 1 mm, the first ring 20 thus moves in concert with the sleeve portion 16 of the compression nut 15 due to the elliptical engagement between the first ring 20 and the sleeve portion 16. Similarly, the second ring 22 also moves in concert with the sleeve portion 16 of the compression nut 15 due to the elliptical engagement between the second ring 22 and the sleeve portion 16. Accordingly, the compression nut 15, the rings 20, 22 and the bowl 12 move in concert and are rotatable freely relative to the cap 11 and the head tube 30.

Figure 4:
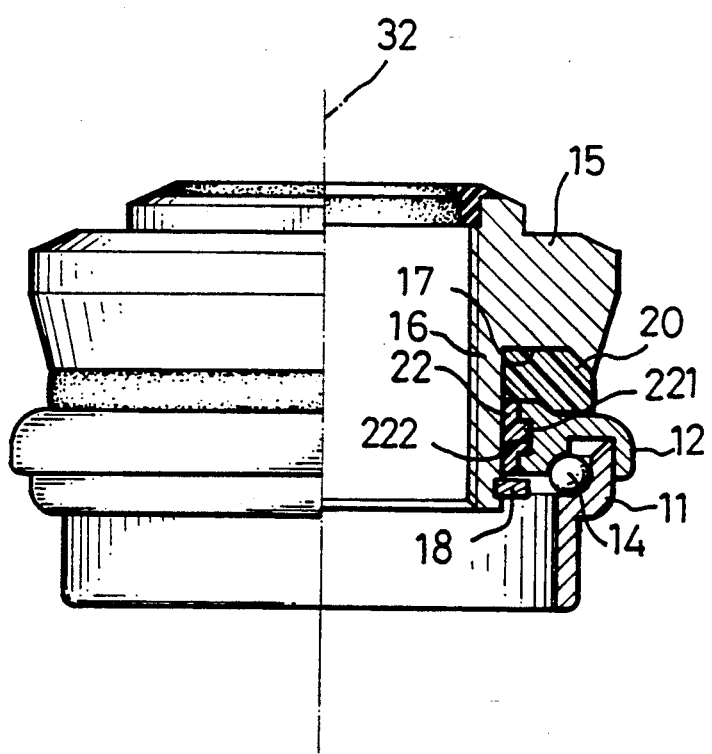
FIG. 4 is an enlarged partial cross sectional view illustrating the upper journal.

Referring next to FIG. 4, when a vibration or shock is transmitted to the journal of the bicycle, the compression nut 15 may compress the rings 20, 22, and the clamping ring 18 may move downward relative to the bowl 12, whereby, the rings 20, 22 absorb the vibration and shock that transmitted to the journal of the bicycle, such that the user may feel more comfortable. For a mountain bike rider, this is particular useful. The clamping ring 18 limits the upward movement of the sleeve portion 16 relative to the bowl 12.

Similarly, as shown in FIG. 1, a cap 51 is engaged on the lower portion of the head tube 30, a bowl 52 is engaged on the cap 51 with a bearing 54 disposed therebetween, a compression nut 55 is engaged on the bowl 52 and threadedly engaged on the frame fork and includes a sleeve 56 extended upward so as to form a notch 57 for receiving two rings 60, 62, and a clamping ring 58 engaged on the upper and outer peripheral portion of the sleeve 56 for engagement with the inner and upper portion of the bowl 52. The rings 60, 62 are also made of elastomeric materials for absorbing shocks and vibrations transmitted through the frame fork of the bicycle.

Accordingly, the journal includes a shock absorption configuration formed therein for absorbing shocks and vibrations that ma be transmitted to the handle of the bicycle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A journal of a bicycle comprising a cap engaged on a head tube of said bicycle, a bowl rotatably engaged on said cap, a bearing engaged between said cap and said bowl, a compression nut engaged on said bowl, and circumferential elastomeric means engaged between said compression nut and said bowl for absorbing shocks and vibrations transmitted to said journal.

2. A journal according to claim 1, wherein said compression nut includes a sleeve portion extended downward therefrom and arranged such that an annular notch is formed between a lower portion of said compression nut and an outer peripheral portion of said sleeve portion, said means for absorbing shocks and vibrations is engaged in said annular notch.

3. A journal according to claim 2, wherein said means for absorbing shocks and vibrations includes a first ring and a second ring engaged in said annular notch of said compression nut, said first ring is engaged between said lower portion of said compression nut and said bowl, said second ring is engaged between said sleeve portion of said compression nut and said bowl.

4. A journal according to claim 3, wherein said sleeve portion includes an elliptical outer peripheral portion, said first ring and said second ring each includes an elliptical inner peripheral portion for engagement with said elliptical outer peripheral portion of said sleeve portion, such that said first ring and said second ring and said compression nut move in concert.

5. A journal according to claim 4, wherein said second ring includes a plurality of first teeth formed on an outer peripheral portion thereof, and said bowl includes an inner peripheral portion having a plurality of second teeth formed therein for engagement with said first teeth of said second ring, whereby, said second ring and said bowl rotate in concert.

6. A journal according to claim 3, wherein said second ring includes a rib formed on an outer peripheral portion thereof, said bowl includes an annular slot formed in an inner peripheral portion thereof for engagement with said rib of said second ring.

7. A journal according to claim 2, wherein said sleeve portion includes a clamping ring engaged on a lower and outer peripheral portion thereof for engagement with said bowl in order to limit the upward movement of said compression relative to said bowl.

8. A journal of a bicycle comprising a cap engaged on a head tube of said bicycle, a bowl rotatably engaged on said cap, a bearing engaged between said cap and said bowl, a compression nut engaged on said bowl, a sleeve portion extended downward from said compression nut and arranged such that an annular notch is formed between a lower portion of said compression nut and an outer peripheral portion of said sleeve portion, a first ring and a second ring engaged in said annular notch of said compression nut, said first ring engaged between said lower portion of said compression nut and said bowl, and said second ring engaged between said sleeve portion of said compression nut and said bowl in order to absorb shocks and vibrations that transmitted to said journal.

9. A journal according to claim 8, wherein said sleeve portion includes an elliptical outer peripheral portion, said first ring and said second ring each includes an elliptical inner peripheral portion for engagement with said elliptical outer peripheral portion of said sleeve portion, such that said first ring and said second ring and said compression nut move in concert.

10. A journal according to claim 9, wherein said second ring includes a plurality of first teeth formed on an outer peripheral portion thereof, and said bowl includes an inner peripheral portion having a plurality of second teeth formed therein for engagement with said first teeth of said second ring, whereby, said second ring and said bowl rotate in concert.

11. A journal according to claim 8, wherein said second ring includes a rib formed on an outer peripheral portion thereof, said bowl includes an annular slot formed in an inner peripheral portion thereof for engagement with said rib of said second ring.

12. A journal according to claim 8, wherein said sleeve portion includes a clamping ring engaged on a lower and outer peripheral portion thereof for engagement with said bowl in order to limit the upward movement of said compression relative to said bowl.

* * * * *